(12) United States Patent  
McCallum et al.

(10) Patent No.: US 8,839,115 B2  
(45) Date of Patent: Sep. 16, 2014

(54) METHOD AND SYSTEM FOR PROVIDING INTERACTIVE FLOW CHART ELEMENTS

(75) Inventors: Brian S. McCallum, Owasso, OK (US); Jim Dillon, Collinsville, OK (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1226 days.

(21) Appl. No.: 12/336,788

(22) Filed: Dec. 17, 2008

(65) Prior Publication Data

US 2010/0153852 A1    Jun. 17, 2010

(51) Int. Cl.  
*G06F 15/177*    (2006.01)  
*G06Q 10/06*    (2012.01)

(52) U.S. Cl.  
CPC ..................... *G06Q 10/06* (2013.01)  
USPC ........................................................ 715/736

(58) Field of Classification Search  
CPC ...................................................... G06Q 10/06  
USPC ........................................................ 715/736  
See application file for complete search history.

(56) References Cited

U.S. PATENT DOCUMENTS

| | | | |
|---|---|---|---|
| 6,571,236 B1 * | 5/2003 | Ruppelt | 714/25 |
| 7,673,036 B1 * | 3/2010 | Tolbert, Jr. | 709/224 |
| 7,937,623 B2 * | 5/2011 | Ramacher et al. | 714/37 |
| 2005/0039194 A1 * | 2/2005 | Boegner et al. | 719/328 |
| 2007/0192370 A1 * | 8/2007 | Kim et al. | 707/104.1 |
| 2008/0109730 A1 * | 5/2008 | Coffman et al. | 715/733 |
| 2009/0044130 A1 * | 2/2009 | Saluja | 715/750 |

* cited by examiner

*Primary Examiner* — Boris Pesin  
*Assistant Examiner* — Angie Badawi (57) ABSTRACT

Exemplary embodiments include methods and systems for diagnosing and/or analyzing one or more service problems including an acquire module configured to acquire one or more interactive flow chart methods to diagnose one or more service problems, wherein each of the one or more interactive flow chart methods comprises one or more method steps. Also, the system may include an analytical module configured to provide a first method step of the one or more interactive flow chart methods to a user and provide a second method step of the one or more interactive flow chart methods based at least in part on a user feedback to the first method step; and a presentation module configured to display a diagnostic report of the one or more service problems.

18 Claims, 8 Drawing Sheets

METHOD AND SYSTEM FOR PROVIDING INTERACTIVE FLOW CHART ELEMENTS

BACKGROUND

As the variety of each service and the number of services, that service providers may provide, continue to grow, diagnosing and analyzing problems associated with these services may become more difficult. Today, one or more service providers may provide a household with Internet, telephone, and/or television services. Reducing downtime and/or avoiding difficulties associated with one or more of these services are increasingly becoming more important to these service providers. Conventional diagnostic and/or analysis of service problems typically may include a field technician being dispatched to the household to manually access each component in order to diagnose and analyze the service problem. Such a process is typically tedious and time consuming. For example, using conventional diagnostic tools and techniques may require a technician to swap out one or more components in order to isolate a faulty component. In addition, conventional diagnostic tools and techniques may require a manual analysis of the collected information in order to identify one or more service problems and may be error prone due to a lack of a standardized methodology. As a result, resolving service problems becomes technician dependent. In some cases, the field technicians may rely on manuals having a vast volume of pages which may make the diagnostic and/or analysis of a service problem difficult and inefficient. As a result, conventional diagnostic and analysis of service problems may be inefficient, costly, and/or time-consuming.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A system and method in accordance with exemplary embodiments for providing an interactive flow chart method for diagnosing and/or analyzing service problems in a timely and efficient manner. In an exemplary embodiment, the system and method may include a plurality of interactive flow chart methods associated with service problems. The interactive flow chart methods may be stored in a database and may be accessed by a plurality of users via a server. For example, the system may provide an index (e.g., via an interface) of the plurality of interactive flow chart methods stored in the database to the plurality of users. Thereafter, the users may select an interactive flow chart method based at least in part on the service problems. The system may enable the users to search the database storing the plurality of interactive flow chart methods based at least in part on the service problem in order to identify interactive flow chart methods to diagnose and/or analyze the service problem. The interactive flow chart methods may include a plurality of method steps in order to allow the user to efficiently diagnose and/or analyze the service problem. The plurality of method steps may be displayed to a user via a user interface in response to comments/requests received from the user. The plurality of method steps may assist the user to diagnose and/or analyze the service problem. The interactive flow chart methods may be modified and/or customize based at least in part on one or more service problems. Also, a user may modify and/or customize the interactive flow chart methods based at least in part on one or more service problems. Moreover, a user may create a plurality of interactive flow chart methods associated with one or more service problems. Also, the system and method may generate one or more summary reports of diagnostic and/or analytical results to inform a user of the service problem.

The description below describes user devices, servers, computers, databases, and other computing devices that may include one or more modules, some of which are explicitly depicted, others of which are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, computers, etc.) separately. The functions described as being performed at various components may be performed at other components, and the various components may be combined and/or separated. Other modifications also may be made.

The description below also describes physical and logical elements of a system architecture, some of which are explicitly shown in figures, others that are not. The inclusion of some physical elements of a system architecture may help illustrate how a given system may be modeled. It should be noted, however, that all illustrations are purely exemplary and that the system architecture described herein may be performed on different varieties of systems which may include different physical and logical elements.

Figure 1:
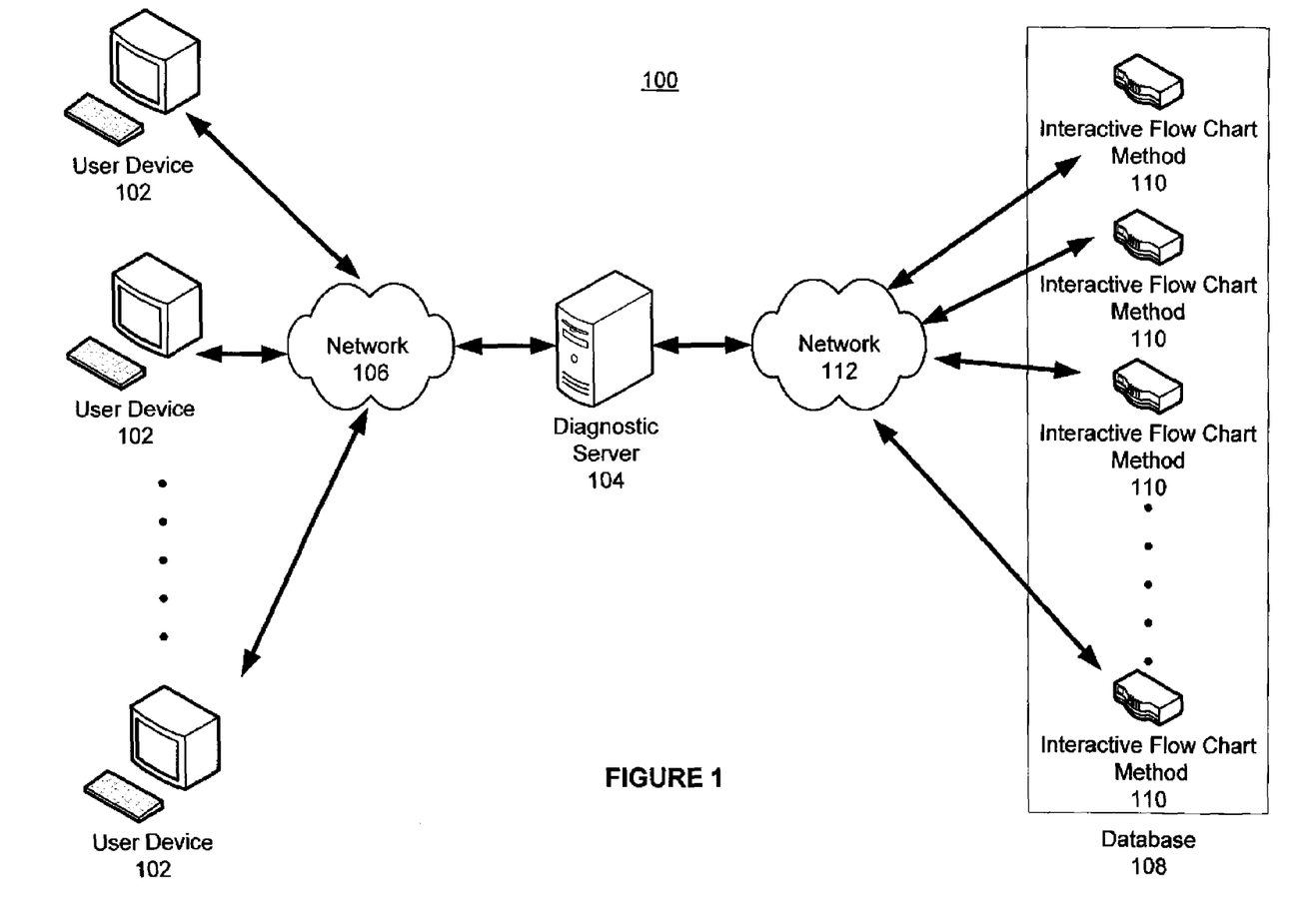
FIG. 1 illustrates a block diagram of a system for providing interactive flow chart methods for diagnosing and/or analyzing one or more service problems in accordance with an exemplary embodiment.

FIG. 1 illustrates a block diagram of a system 100 for providing interactive flow chart methods for diagnosing and/or analyzing one or more service problems in accordance with an exemplary embodiment. The system 100 may include one or more user devices 102 coupled to the diagnostic server 104 via a first network 106. The diagnostic server 104 may access one or more interactive flow chart methods 110 stored in a database 108 via a second network 112. Although, the database 108 shown in FIG. 1 is separate from the diagnostic server 104, it may be appreciated by one skilled in the art that the database 108 may be integrated and/or located locally with the diagnostic server 104. In an exemplary embodiment, a user may use the user device 102 to access the interactive flow chart method 110 stored in the database 108 via the diagnostic server 104. For example, the diagnostic server 104 may receive one or more commands/requests from the user device 102 to access one or more interactive flow chart methods 110 stored in the database 108. Upon receiving the one or more requests, the diagnostic server 104 may access the database 108 to obtain the one or more interactive flow chart methods 110. Thereafter, the diagnostic server 104 may present the one or more interactive flow chart methods 110 to the user via the user device 102.

For example, the user may be associated with, but is not limited to, service providers, enterprises, educational institutions, government agencies, and any individual, group and/or organization running, maintaining and/or providing one or more services. Users within an organization may include, but are not limited to, network architects, network managers, engineers, planners, Network Operations Center (NOC) personnel, marketing, sales engineering, operations personnel, and customer support organizations. The one or more service problems may include, but not limited to, problems associated with a service (e.g., television services, Internet services, and/or telephone services) and/or equipment (e.g., wiring, set-up box, router, modem, television, and/or telephone) associated with a service, problems associated with network elements and/or questions associated with television services features, Internet services features, telephone services features, installation, billing, and/or other problems a service provider and/or a customer may experience. For example, the customers may experience issues associated with dropped wireless telephone calls, missing television channels, and/or loss of an Internet connection.

The one or more user devices 102 may be a computer (e.g., having one or more printing devices), a personal computer, a laptop, a cellular communication device, a workstation, a mobile device, a phone, a handheld PC, a personal digital assistant (PDA), a thin system, a fat system, a network appliance, an Internet browser, a paging, an alert device, a television, an interactive television, a receiver, a tuner, a high definition (HD) television, a HD receiver, a video-on-demand (VOD) system, and/or other any other device that may allow a user to communicate with the diagnostic server 104 via the network 106.

Diagnostic server 104 may be one or more servers to provide one or more interactive flow chart methods 110 to the user devices 102. The diagnostic server 104 may include a SQL Server, UNIX based servers, Windows 2000 Server, Microsoft IIS server, Apache HTTP server, API server, Java sever, Java Servlet API server, ASP server, PHP server, HTTP server, Mac OS X server, Oracle server, IP server, and/or other independent server to provide interactive flow chart methods 110 for diagnosing and/or analyzing one or more service problems. Also, the diagnostic server 104 may store and/or run a variety of software, for example, Microsoft .NET framework.

The first network 106 and/or the second network 112 may be a wireless network, a wired network or any combination of wireless network and wired network in order to provide communication links between the user devices 102, diagnostic servers 104, and/or the database 108. For example, the first network 106 and/or the second network 112 may include, but not limited to, Internet network, satellite network (e.g., operating in Band C, Band Ku and/or Band Ka), wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.11n and 802.11g and/or any other wireless network for transmitting a signal. In addition, the first network 106 and/or the second network 112 may include, but not limited to, telephone line, fiber optics, IEEE Ethernet 802.3, wide area network (WAN), local area network (LAN), global network such as the Internet. Also, the first network 106 and/or the second network 112 may enable, an Internet network, a wireless communication network, a cellular network, an Intranet, or the like, or any combination thereof. The first network 106 and/or the second network may further include one, or any number of the exemplary types of networks mentioned above operating as a stand-alone network or in cooperation with each other.

The database 108 may be one or more storage devices to store a plurality of interactive flow chart methods 110. For example, the database 108 may include, but not limited to, hard drives, read-only memory (ROM), random-access memory (RAM), paper card storage, punched card, tape storage, paper tape, magnetic tape, disk storage, gramophone record, floppy disk, hard disk, ZIP disk, holographic, molecular memory. The database 108 may also include, optical disc, CD-ROM, CD-R, CD-RW, DVD, DVD-R, DVD-RW, DVD+R, DVD+RW, DVD-RAM, Blu-ray, Minidisc, HVD and Phase-change Dual storage device. The database 108 may further include, without limitation, magnetic bubble memory, magnetic drum, core memory, core rope memory, thin film memory, twistor memory, flash memory, memory card, semiconductor memory, solid state semiconductor memory or any other database.

The interactive flow chart methods 110 may include various types of schematic representation of an algorithm or a stepwise process (e.g., boxes of various kinds coupled with arrows) associated with one or more service problems. The interactive flow chart methods 110 may include flow charts designing and/or documenting a process or program to diagnose and/or analyze one or more service problems. In an exemplary embodiment, the interactive flow chart methods 110 may include one or more method steps (e.g., activities denoted as a rectangular box) flow charts and/or a decision (e.g., denoted as a diamond) flow charts. For example, a method step of the interactive flow chart method 110 may have a relationship with one or more other method steps of the interactive flow chart method 110. The relationship between the method steps of the interactive flow chart method 110 may be hierarchical, dependency, parent-child, and/or other relationships in order to establish a connection between the one or more method steps. In an exemplary embodiment, a first method step of the interactive flow chart method 110 may be selected by a user, and one or more method steps associated with the first method step may be provided to the user based at least in part on the selection of the first method step. The interactive flow chart methods 110 may also include quality control flow charts, histogram flow charts, Pareto flow chart, check sheet flow chart, cause-and-effect flow chart, scatter flow chart, and/or other flow charts in order diagnostic and/or analyze one or more service problems.

Figure 2:
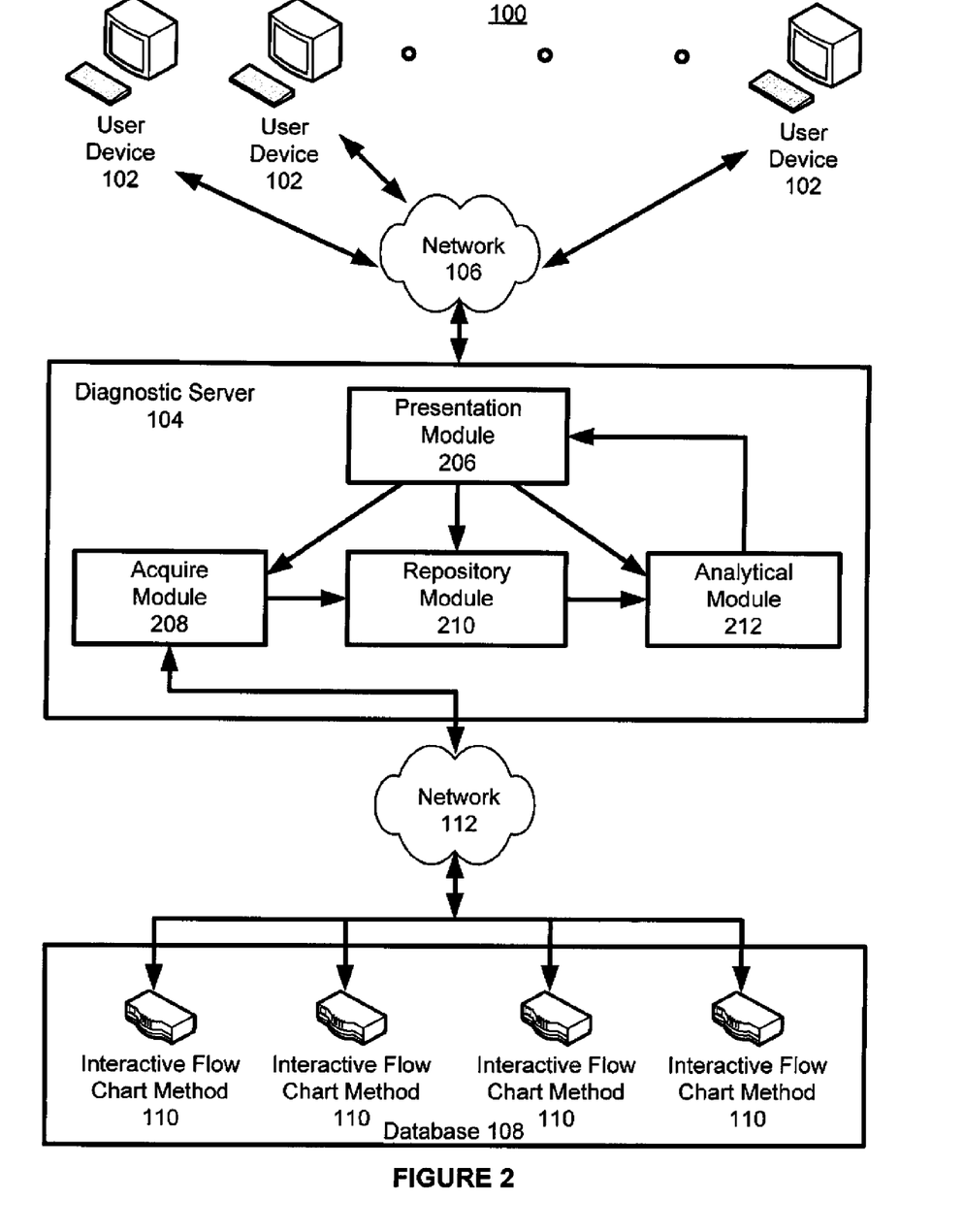
FIG. 2 illustrates a detailed block diagram of a system that may provide interactive flow chart methods for diagnosing and/or analyzing one or more service problems in accordance with an exemplary embodiment.

FIG. 2 illustrates a detailed block diagram of a system 100 that may provide interactive flow chart methods for diagnosing and/or analyzing one or more service problems in accordance with an exemplary embodiment. As shown in FIG. 2, the diagnostic server 104 may include a presentation module 206, an acquire module 208, a repository module 210, and/or an analytical module 212. It is noted that the modules 206, 208, 210, 212 are exemplary and the functions performed by one or more of the modules may be combined with that performed by other modules. The functions described herein as being performed by the modules 206, 208, 210, and 212 also may be separated and may be performed by other modules at devices local or remote to the one or more user devices 102, the diagnostic server 104, and/or the database 108.

In an exemplary embodiment, the acquire module 208 may acquire one or more interactive flow chart methods 110 stored in the database 108 the second network 112. The acquire module 208 may preprocess the interactive flow chart methods 110 acquired from the database 108, e.g., filter, format, segregate, aggregate, etc. The pre-processing of the interactive flow chart methods 110 acquired by the acquire module 208 may include filtering the interactive flow chart methods 110 (e.g., provide the newest version of the interactive flow chart methods 110), formatting the interactive flow chart methods 110 into useful format (e.g., format supported by the user device 102), segregate the interactive flow chart methods 110 into categories based on one or more service problems, and/or aggregate the interactive flow chart methods 110 (e.g., multiple interactive flow chart methods 110 may be used to diagnose and/or analyze one or more service problems). The one or more interactive flow chart methods 110 may be transferred from the acquire module 208 to a repository module 210. The repository module 210 may store and/or manage the one or more interactive flow chart methods 110 transferred from the acquire module 208. An analytic module 212 may access the repository module 210 to obtain the one or more interactive flow chart methods 110 needed to diagnose and/or analyze the one or more service problems. In addition, the one or more method steps of the one or more interactive flow chart methods 110 may be automatically and/or upon a request by a user (e.g., service administrators and/or field technicians), transferred to a presentation module 206 and present to a user via the user device 102. The interactive flow chart methods 110 and/or one or more method steps of the interactive flow chart method 110 may be transferred to the presentation module 206 and presented to a user via the one or more user devices 102. The user may provide one or more selections and/or feedbacks to the presentation module 206 via the one or more user devices 102.

The acquire module 208 may interact with the one or more interactive flow chart methods 110 stored in the database 108. Through these interactions, one or more interactive flow chart methods 110 may be acquired and/or stored. For example, the acquire module 208 may sequentially and/or simultaneously acquire one or more interactive flow chart methods 110. The acquire module 208 may use one or more methods to acquire the one or more interactive flow chart methods 110 via the second network 112. For example, the acquire module 208 may acquire the one or more interactive flow chart methods 110 via telephone, electronic mail, Internet, telecommunication network (TELNET), command line interface (CLI), secure socket header (SSH), simple network management protocol (SNMP), File Transfer Protocol (FTP), Secure Shell (SSH), and/or other methods acquiring one or more interactive flow chart methods 110 from the database 108. The acquire module 208 may provide the one or more interactive flow chart methods 110 acquired from the database 108 to the repository module 210. The acquire module 208 may pre-process the one or more interactive flow chart methods 110 acquired from the database 108 before transferring the one or more interactive flow chart methods 110 to the repository module 210. In another exemplary embodiment, the acquire module 208 may receive one or more newly created and/or modified interactive flow chart methods 110 from the analytical module 212 and/or the repository module 210. The acquire module 208 may transfer the one or more newly created and/or modified interactive flow chart methods 110 to the database 108 via the second network 112.

A user associated with the one or more user devices 102 may interactively diagnose and/or analyze one or more service problems via the one or more interactive flow chart methods 110. The presentation module 206 may provide an interface between the one or more user devices 102 and the diagnostic server 104. The presentation module 206 may include a user interface, e.g., a graphical user interface, to receive requests/commands from a user (e.g., a service administrator and/or field technician), and to provide interactive flow chart methods 110 and/or one or more method steps of the interactive flow chart method 110 to the user via the one or more user devices 102 and the first network 106. For example, the presentation module 206 may provide an initial method step of the interactive flow chart method 110 and may provide one or more subsequent method steps of the interactive flow chart method 110 based at least in part on one or more received requests/commands from the user. For example, the presentation module 206 may receive one or more requests/commands from a user via the one or more user devices 102 in order to create and/or modify the one or more interactive flow chart methods 110 and/or each method step of the one or more interactive flow chart methods 110.

The presentation module 206 may include an Application Programming Interface (API) to interact with the one or more user devices 102 via the first network 106. In response to receiving a request from a user (e.g., a service administrator and/or field technician) via the one or more user devices 102 and/or the first network 106, the presentation module 206 may send requests/commands (or control signals, etc.) to the acquire module 208, the repository module 210, and/or the analytical module 212. In an exemplary embodiment, in response to a request/command, the analytical module 212 may (a) retrieve one or more interactive flow chart methods 110 from the repository module 210 and/or may cause the acquire module 208 to retrieve the one or more interactive flow chart methods 110 from the database 108, (b) process the one or more interactive flow chart methods 110, and/or (c) provide the one or more interactive flow chart methods 110 and/or one or more method steps of the one or more interactive flow chart methods 110 to the presentation module 206. The presentation module 206 may provide the interactive flow chart methods 110 and/or the one or more method steps of the one or more interactive flow chart methods 110 to the user via one or more user devices 102 for display. As a result, system 100 may allow the user to efficiently diagnose and/or analyze one or more service problems.

The presentation module 206 may include a report generator module (not shown) for generating reports. For example, upon a user's (e.g., a service administrator and/or field technician) request, a report may be generated. The report may include date, time, one or more interactive flow chart methods 110, method steps of the one or more interactive flow chart methods 110, one or more service problems diagnosed and/or analyzed, conclusion of the diagnostic and/or analysis, name of user, name of organization, duration of the one or more service problems. Also, a report may be automatically generated when a user is logged into the system 100 in order to update the user of conclusion of the diagnostic and/or analysis results since the last time the user was logged into the system 100. Further, a report may be automatically generated at the conclusion of the diagnostic and/or analysis process of one or more service problems. Thus, a user may be informed of concerns, issues, and/or repairs that may be needed associated with the one or more service problems and/or the interactive flow chart methods 110 used in diagnosing and/or analyzing the one or more service problems.

In another exemplary embodiment, in response to a request/command, the analytical module 212 may (a) identify one or more interactive flow chart methods 110 and/or one or more method steps of the one or more interactive flow chart methods 110 based at least in part on the request/command, (b) retrieve one or more interactive flow chart methods 110 from the repository module 210 and/or may cause the acquire module 208 to retrieve one or more interactive flow chart methods 110 from the database 108, and/or (c) modify the one or more interactive flow chart methods 110 and/or the one or more method steps of the one or more interactive flow chart methods 110 based at least in part on the request/command. Also, in response to a request/command, the analytical module 212 may (a) create one or more new interactive flow chart methods 110 having one or more method steps associated with one or more service problems and/or (b) store the one or more new interactive flow chart methods 110 in the repository module 210 and/or the database 108.

The repository module 210 may store and/or manage one or more interactive flow chart methods 110. For example, the repository module 210 may store one or more interactive flow chart methods 110 locally and/or remotely. Also, the repository module 210 may store one or more interactive flow chart methods 110 provided by the acquire module 208. The repository module 210 may provide an interface, e.g., a uniform interface, for other modules within the system 100 and may read, write, and search the one or more interactive flow chart methods 110 in one or more databases. The repository module 210 may also perform other functions, such as, but not limited to, concurrent access, backup and archive functions. Also, the repository module 210 may compress, store, backup, archive, transfer and/or discard the one or more interactive flow chart methods 110 after a period of time, e.g., a month, a quarter, a year. The repository module 210 may provide the one or more interactive flow chart methods 110 to the analytical module 212. Also, the repository module 210 may include one or more databases to store one or more requests/commands from a user. For example, the requests/commands from the user may include keywords, modified method steps of the one or more interactive flow chart methods 110, one or more newly created interactive flow chart methods 110, sets of rules and/or conditions, search queries, and/or other inputs from the user.

The analytical module 212 may retrieve one or more interactive flow chart methods 110 from the repository module 210 and/or the acquire module 208 and process the one or more interactive flow chart methods 110. The analytical module 212 may communicate with the presentation module 206, the acquire module 208 and/or the repository module 210. The analytical module 212 may further include a plurality of sub-analytical modules to perform various types of interactive flow chart methods 110 processing. The analytical module 212 may determine a relationship between one or more method steps of the interactive flow chart methods 110. In an exemplary embodiment, the analytical module 212 may determine one or more first method steps of the interactive flow chart methods 110 and may present the first method step to a user via the presentation module 206 and/or the one or more user devices 102. The user may provide one or more requests/commands to the analytical module 212 via the one or more user devices 102 and/or the presentation module 206. The analytical module 212 may determine one or more second method steps associated with the one or more first method steps of the interactive flow chart methods 110 based at least in part on the one or more requests/commands provided by the user. Thereafter, the analytical module 212 may provide the one or more second method steps of the interactive flow chart methods 110 to the user via the presentation module 206 and/or the one or more user devices 102. The user may again provide one or more requests/commands to the analytical module 212 and the above described process may repeat until the user may determine one or more service problems and/or one or more last method steps of the interactive flow chart methods 110.

In another exemplary embodiment, the analytical module 212 may determine a relationship of a plurality of method steps of the interactive flow chart methods 110. For example, a plurality of method steps of the interactive flow chart methods 110 may form one or more strings and/or groups of method steps within the interactive flow chart methods 110. The analytical module 212 may determine a first string and/or first group of method steps of the interactive flow chart methods 110 and may present the first string and/or the first group of method steps to a user via the presentation module 206 and/or the one or more user devices 102. The user may provide one or more requests/commands to the analytical module 212 via the one or more user devices 102 and/or the presentation module 206. The analytical module 212 may determine one or more second strings and/or second groups of method steps associated with the first string and/or the first group of method steps based at least in part on the one or more requests/commands provided by the user. Thereafter, the analytical module 212 may provide the one or more second strings and/or the second groups of method steps to the user via the presentation module 206 and/or the one or more user devices 102. The user may again provide one or more requests/commands to the analytical module 212 and the above described process may repeat until the user may determine one or more service problems and/or one or more last strings and/or last groups of method steps of the interactive flow chart methods 110.

The analytical module 212 may modify and/or create one or more interactive flow chart methods 110 based at least in part on one or more requests/commands from a user. In an exemplary embodiment, the analytical module 212 may modify the interactive flow chart methods 110 based at least in part on one or more requests/commands from the user. For example, analytical module 212 may modify a relationship between the one or more method steps of the interactive flow chart methods 110. Also, the analytical module 212 may modify a relationship between the one or more strings and/or groups of method steps of the interactive flow chart methods 110. In an exemplary embodiment, the analytical module 212 may modify an association of the one or more method steps of the interactive flow chart method 110. For example, a first method step of the interactive flow chart method 110 may be associated with a second method step of the interactive flow chart method 110. The user may modify the second method step of the interactive flow chart method 110 to a third method step of the interactive flow chart method 110. Also, the user may modify the second method step of the interactive flow chart method 110 to associate with both the first method step and the third method step of the interactive flow chart method 110. The analytical module 212 may modify text of the one or more method steps of the interactive flow chart methods 110. For example, the one or more method steps of the interactive flow chart method 110 may include text describing one or more service problems. The user may modify the text in the one or more method steps of the interactive flow chart method 110 describing the one or more service problems.

Moreover, the analytical module 212 may create and/or add one or more method steps to the interactive flow chart methods 110. The analytical module 212 may store the modified interactive flow chart methods 110 locally at the repository module 210 and/or at the database 108 via the network 106. In another exemplary embodiment, the analytical module 212 may create one or more interactive flow chart methods 110 associated with one or more service problems based at least in part on one or more requests/commands from a user. For example, analytical module 212 may create one or more interactive flow chart methods 110 including one or more method steps to diagnose and/or analyze one or more service problems. A user may encounter one or more service problems that may not be associated with one or more interactive flow chart methods 110 stored in the database 108. The user may create one or more new interactive flow chart methods 110 having one or more method steps in order to diagnose and/or analyze the one or more service problems. The analytical module 212 may store the one or more newly created interactive flow chart methods 110 locally at the repository module 210 and/or at the database 108 via the network 106.

The analytical module 212 may perform various analyses, such as, but not limited to, counting analysis, geographical analysis, time series analysis, forensic analysis, and/or pattern matching analysis. For example, using the one or more user devices 102, a user may select various types of data analyses to be performed. For example, a user may select counting analysis where the analytical module 212 may count a number of times an interactive flow chart method 110 may be used to diagnose and/or analyze one or more service problems. Also, a user may select geographical analysis where the analytical module 212 may count a number of times an interactive flow chart method 110 may be used to determine one or more service problems in a geographical region. Further, a user may select a time series data analysis where one or more service problems diagnosed and/or analyzed by one or more interactive flow chart methods 110 at an earlier time may be compared with the one or more service problems diagnosed and/or analyzed by one or more interactive flow chart methods 110. Moreover, a user may select forensic data analysis where a user may select to analyze the one or more interactive flow chart methods 110 used to diagnose and/or analyze one or more service problems in the past. In addition, a user may select pattern matching analysis where one or more interactive flow chart methods 110 may be matched with the one or more service problems. The analytic module 212 may summarize and aggregate one or more interactive flow chart methods 110 stored in the repository module 210 and/or the database 108. Moreover, the analytical module 212 may summarize and/or aggregate one or more modified and/or created interactive flow chart methods 110. In addition, analytic module 212 may transmit a report/summary message to the presentation module 206 to generate one or more diagnostic and/or analytical results from the one or more interactive flow chart methods 110 and present the diagnostic and/or analytical results to the user.

The analytical module 212 may provide users an index and/or a table of one or more interactive flow chart methods 110 stored in the database 108 and/or the repository module 210. For example, users may identify one or more interactive flow chart methods 110 associated with the one or more service problems by searching the index and/or the table of the interactive flow chart methods 110. In an exemplary embodiment, the analytical module 212 may arrange the one or more interactive flow chart methods 110 in the index and/or the table in an alphabetical order, a categorical order, a sequential order, most recently used order, and/or other orders in order to allow users to efficiently search for the one or more interactive flow chart methods 110. The index and/or the table may arrange the one or more interactive flow chart methods 110 in an alphabetical order to the user. Also, the index and/or the table may arrange the one or more interactive flow chart methods 110 based at least in part on one or more categories of the service problems (e.g., television category, telephone category, or Internet category). The index and/or the table may arrange the one or more interactive flow chart methods 110 based at least in part on a sequence (e.g., preliminary interactive flow chart method, intermediate interactive flow chart method, and final interactive flow chart method). Further, the index and/or the table may arrange the one or more interactive flow chart methods 110 from most recently used to least recently used. For example, users may search the index and/or the table of interactive flow chart methods 110 based at least in part on the one or more service problems in order to identify one or more interactive flow chart methods 110 to diagnose and/or analyze the one or more service problems.

Also, the analytical module 212 may provide users a search query function in order to identify one or more interactive flow chart methods 10 stored in the database 108 and/or the repository module 210. For example, the search query function may allow users to input one or more keywords to the analytical module 212 via one or more user devices 102 and/or the presentation module 206. The analytical module 212 may receive one or more keywords from the user and may identify one or more interactive flow chart methods 110 based at least in part on the one or more keywords. For example, the analytical module 212 may search one or more interactive flow chart methods 110 stored in the database 108 and/or the repository module 210 based at least in part on the one or more keywords. The analytical module 212 may identify one or more interactive flow chart methods 110 that may match the one or more keywords and present the one or more interactive flow chart methods 110 to the user. The user may select one or more interactive flow chart methods 110 presented by the analytical module 212 in order to diagnose and/or analyze one or more service problems.

Figure 3A:
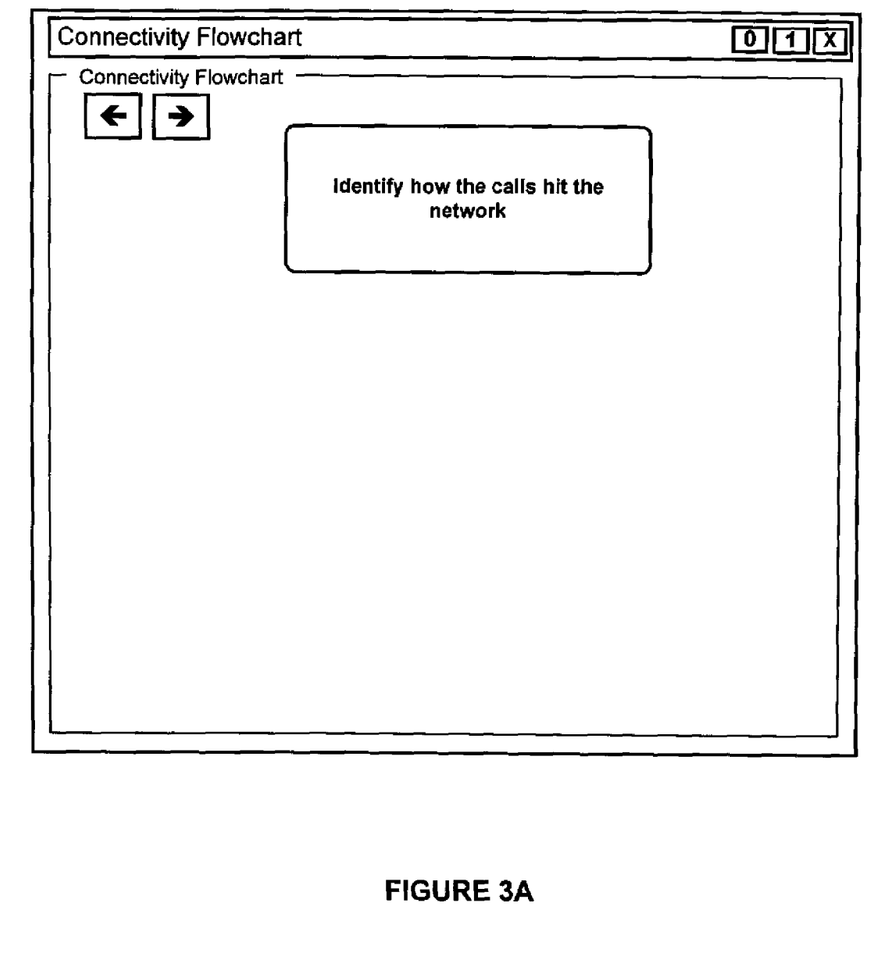
FIGS. 3A-3D illustrate screenshots of an interactive flow chart methods for diagnosing and/or analyzing one or more service problems in accordance with an exemplary embodiment.

FIGS. 3A-3D illustrate screenshots of an interactive flow chart method for diagnosing and/or analyzing one or more service problems in accordance with an exemplary embodiment. A user may utilize one or more interactive flow chart methods 110 to diagnose and/or analyze one or more service problems. In an exemplary embodiment, the user may input one or more requests/commands to the diagnostic server 104 via the one or more user devices 102. The presentation module 206 of the diagnostic server 104 may receive the one or more requests/commands from the one or more user devices 102 via the first network 106. The presentation module 206 may transfer the one or more requests/commands to the acquire module 208, the repository module 210, and/or the analytical module 212. The acquire module 208 may acquire one or more interactive flow chart methods 110 based at least in part on the one or more requests/commands from the user. The acquire module 208 may transfer the one or more acquired interactive flow chart methods 110 to the repository module 210 and/or the analytical module 212. The analytical module 212 may provide the one or more interactive flow chart methods 110 and/or one or more method steps of the interactive flow chart method 110 to the user via the presentation module 206 and/or the one or more user devices 102. As illustrated in FIG. 3A, a user may select an interactive flow chart method 110 to diagnose and/or analyze one or more service problems, for example, "how calls hit the network". The analytical module 212 may provide one or more interactive flow chart methods 110 associated with "how calls hit the network" service problem to the user via the presentation module 206 and/or one or more user devices 102. As shown in FIG. 3A, the analytical module 212 may provide an initial method step of the interactive flow chart method 110 associated with the "how calls hit the network" service problem to the user. The user may provide one or more requests/commands via the one or more user devices 102 (e.g., mouse, keyboard, and/or input devices) to the analytical module 212. The analytical module 212 may provide one or more subsequent method steps of the interactive flow chart method 110 associated with the "how the calls hit the network" service problem to the user.

Figure 3B:
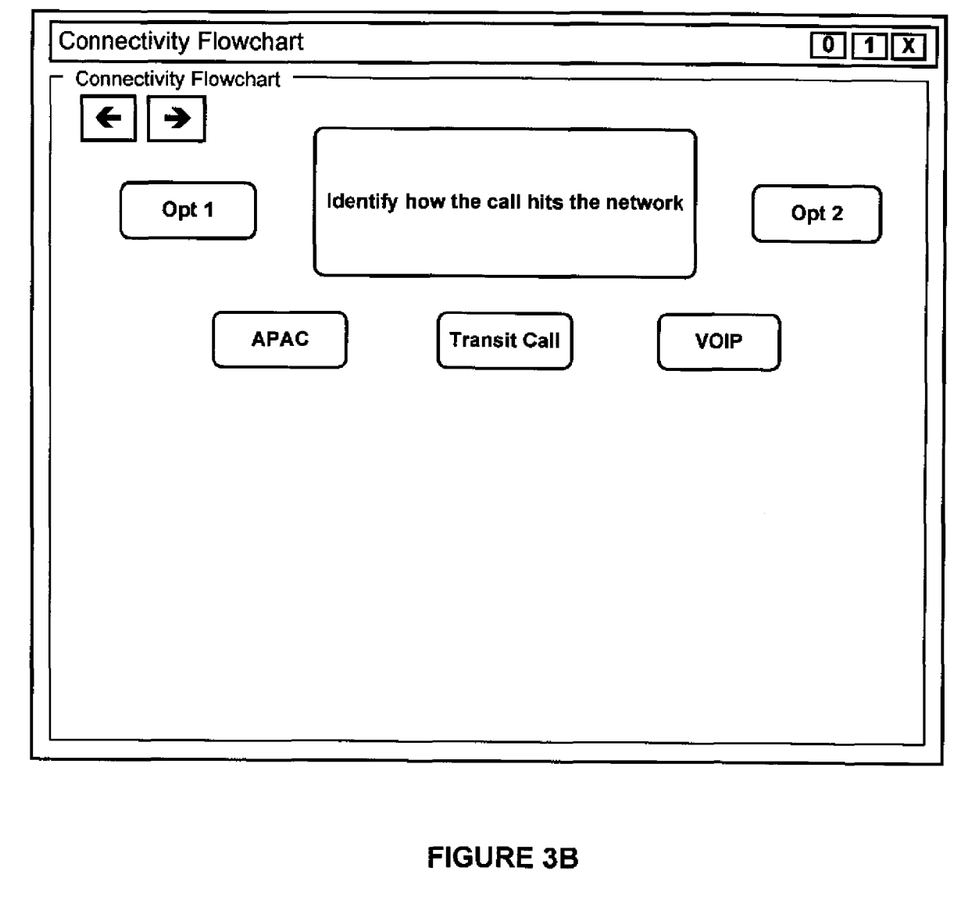

As illustrated in FIG. 3B, the analytical module 212 may provide one or more method steps of the interactive flow chart method 110 associated with the "how the calls hits the network" service problem to the user via the presentation module 206 and/or the one or more user devices 102. For example, the analytical module 212 may provide five method steps of the interactive flow chart methods 110 associated with the "how the calls hit the network" service problem. As shown in FIG. 3B, the analytical module 212 may provide the user "Opt 1" method step, "APAC" method step, "Transit Call" method step, "VOIP" method step, and/or "Opt 2" method step of the interactive flow chart method 110 associated with the "how the calls hits the network" service problem. The user may select one or more method steps of the interactive flow chart method 110 associated with the "how the calls hit the network" service problem. For example, the user may click via a mouse, type via a keyboard, touch via a touch screen, and/or other selection methods in order to select one or more desired method steps of the interactive flow chart method 110 associated with the "how the calls hits the network" service problem.

Figure 3C:
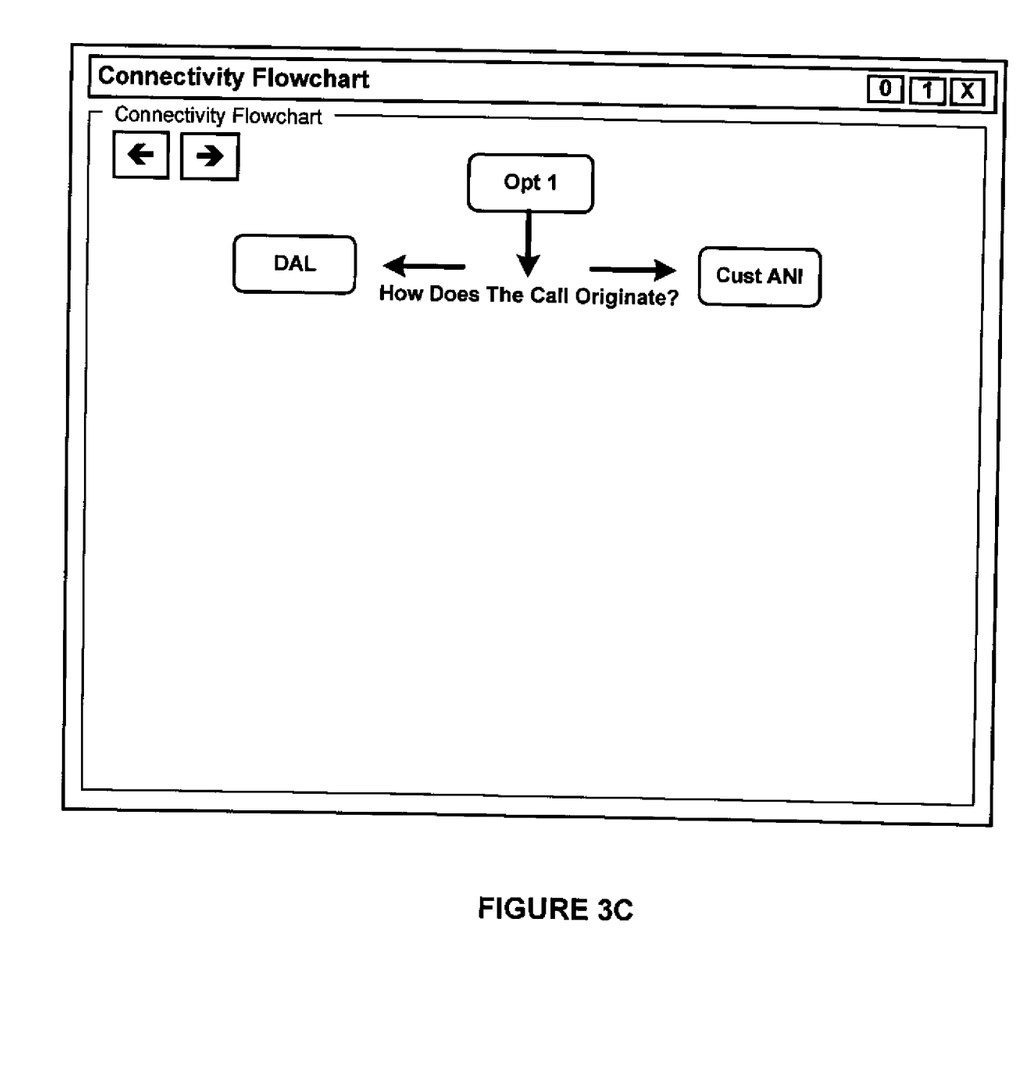

As illustrated in FIG. 3C, the user may select "Opt 1" method step of the interactive flow chart method 110 associated with the "how the calls hit the network" service problem. For example, the analytical module 212 may receive the user selection and/or provide one or more method steps of the interactive flow chart method 110 associated with the "how the calls hits the network" service problem based at least in part on the user selection. For example, the analytical module 212 may provide "DAL" method step and/or "Cust ANI" method step based at least in part the user selection of the "Opt 1" method step of the interactive flow chart method 110 associated with the "how the calls hits the network" service problem. The user may select either the "DAL" method step and/or the "Cust ANI" method steps of the interactive flow chart method 110 associated with the "how the calls hit the network" service problem.

Figure 3D:
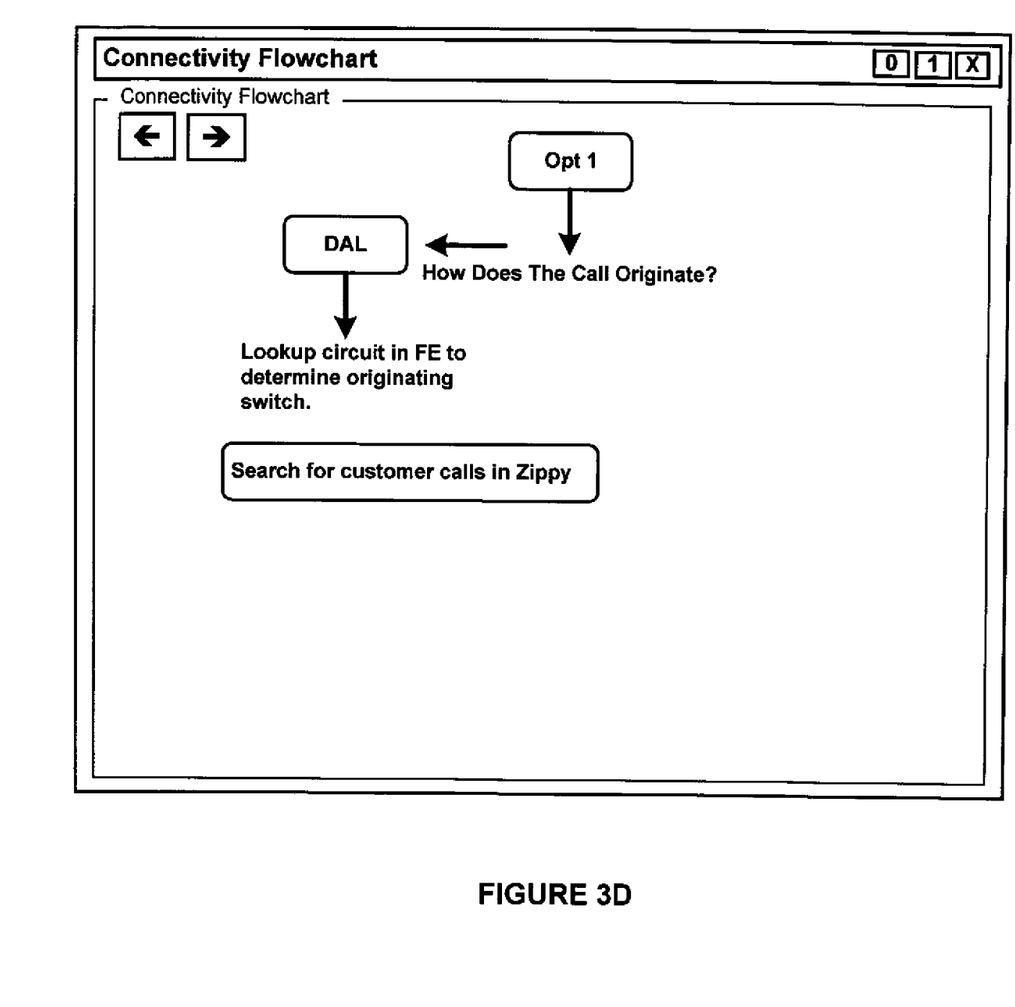

As illustrated in FIG. 3D, user may select "DAL" method step of the interactive flow chart method 110 associated with the "how the calls hits the network" service problem. For example, the analytical module 212 may receive the user selection of "DAL" method step and/or provide diagnostic and/or analytical results of the one or more service problems. For example, the analytical module 212 may provide the diagnostic and/or analytical result of the one or more service problems to the user based at least in part on the selection of the "DAL" method step of the interactive flow chart method 110 associated with the "how the calls hits the network" service problem. For example, the analytical module 212 may provide the diagnostic and/or analytical result to the user which may include "lookup circuit in FE to determine originating switch" and "search for customer calls in Zippy."

Figure 4:
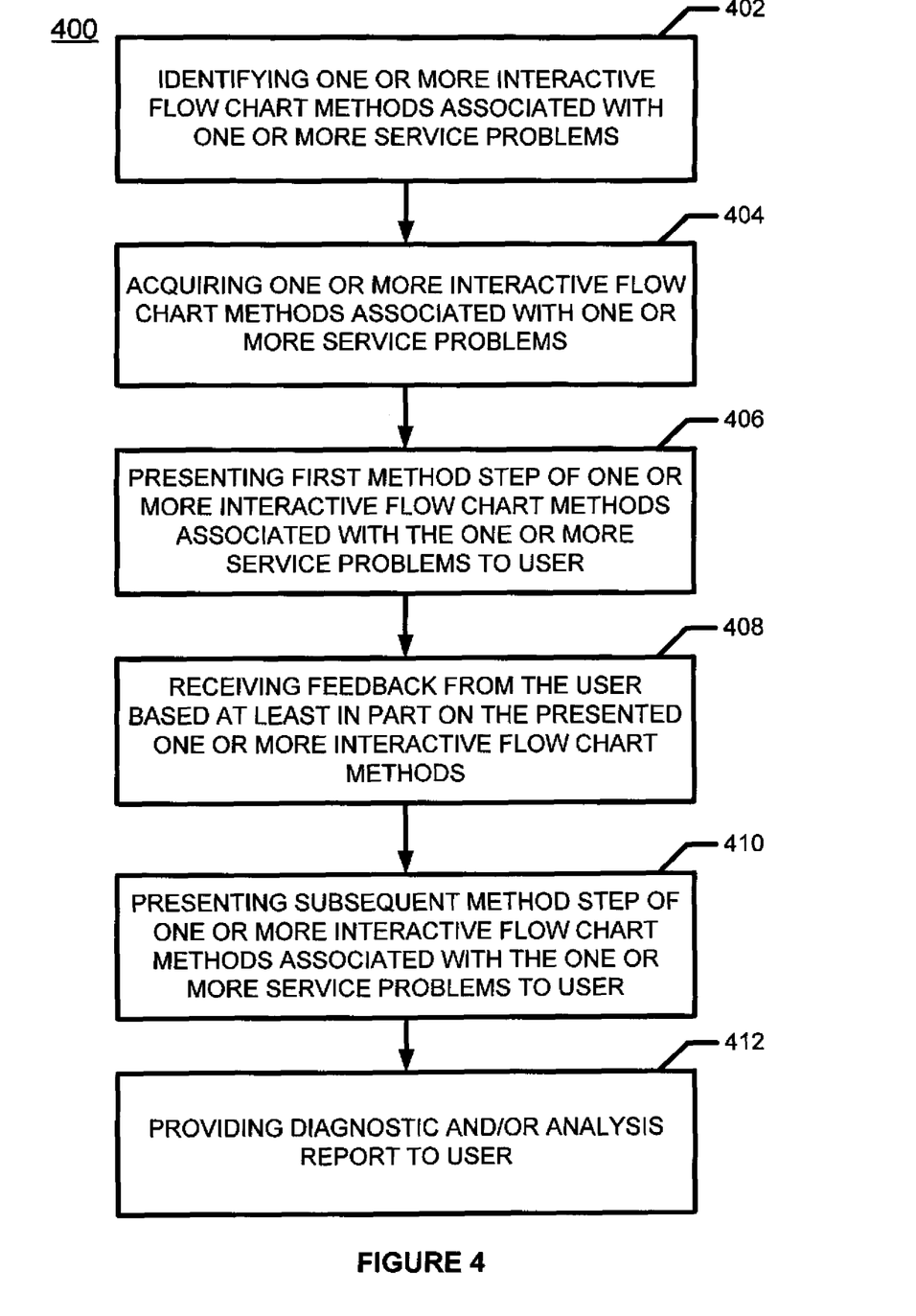
FIG. 4 illustrates a flow diagram of a method for providing interactive flow chart methods for diagnosing and/or analyzing one or more service problems in accordance with an exemplary embodiment.

FIG. 4 illustrates a system flow diagram to provide interactive flow chart methods for diagnosing and/or analyzing one or more service problems in accordance with an exemplary embodiment. The flow diagram 400 shown in FIG. 4 can be executed or otherwise performed by one or a combination of various systems. The flow diagram 400 described below may be carried out by system 100 shown in FIGS. 1 and 2 by way of example, and various elements of the system 100 are referenced in explaining the example flow diagram of FIG. 4. For example, one or more interactive flow chart methods 110 may allow one or more users to diagnose and/or analyze one or more service problems efficiently. Each block shown in FIG. 4 represents one or more processes, methods, or subroutines carried in the exemplary method 400. The method 400 may begin at block 402.

At block 402, users may identify one or more interactive flow chart methods 110 in order to diagnose and/or analyze one or more service problems. For example, one or more service problems may arise and user may identify one or more interactive flow chart methods 110 in order to diagnose and/or analyze the one or more service problems. For example, the user may input one or more keywords into a diagnostic server 104 via one or more user devices 102 in order to search for one or more interactive flow chart methods 110. Analytical module 212 of the diagnostic server 104 may search a database 108 storing one or more interactive flow chart methods 110 based at least in part on the one or more keywords inputted by the user. The analytical module 212 may identify one or more interactive flow chart methods 110 based at least in part on the one or more keywords and present the one or more identified interactive flow chart methods 110 to the user via the presentation module 206 and/or the one or more user devices 102. Also, the user may identify one or more interactive flow chart methods 110 associated with the one or more service problems by searching an index and/or a table of interactive flow chart methods 110. In an exemplary embodiment, the analytical module 212 may arrange the one or more interactive flow chart methods 110 in the index and/or the table in an alphabetical order, a categorical order, a sequential order, most recently used order, and/or other orders. The user may search the index and/or the table of interactive flow chart methods 110 based at least in part on the one or more issues in order to identify one or more interactive flow chart methods 110 to diagnose and/or analyze the one or more service problems. After identifying one or more interactive flow chart methods 110 associated with the one or more service problems, the method 400 may proceed to block 404.

At block 404, one or more interactive flow chart methods 110 may be acquired. For example, the user may identify one or more interactive flow chart methods 110 in order to diagnose and/or analyze one or more service problems. The user may input one or more identified interactive flow chart methods 110 to the diagnostic server 104 via the one or more user devices 102. The acquire module 208 of the diagnostic server 104 may acquire one or more interactive flow chart methods 110 from the database 108 via the second network 112. The acquire module 208 may pre-process the one or more acquired interactive flow chart methods 110. For example, the acquire module 208 may pre-process the one or more acquired interactive flow chart methods 110 by filtering, formatting, segregating, aggregating, and/or other processing methods. The acquire module 208 may provide the one or more acquired interactive flow chart methods 110 to a repository module 210 and/or the analytical module 212. In another exemplary embodiment, one or more identified interactive flow chart methods 110 for diagnose and/or analyze one or more service problems may be acquired from a repository module 210. For example, the repository module 210 may store one or more identified interactive flow chart methods 110 and may provide the one or more identified interactive flow chart methods 110 to the analytical module 212. After acquiring one or more interactive flow chart methods 110 associated with one or more service problems, the method 400 may proceed to block 404.

At block 406, first method step of one or more interactive flow chart methods 110 associated with the one or more service problems may be presented to the user. For example, the analytical module 212 may provide the one or more interactive flow chart methods 110 associated with the one or more service problems to the user via the presentation module 206 and/or the one or more user devices 102. The one or more method steps may be presented to the user, either as a single method step or as a group of method steps. For example, the analytical module 212 may determine one or more first method steps of the one or more interactive flow chart methods 110. The analytical module 212 may provide the one or more first method steps of the interactive flow chart methods 110 to the user via a presentation module 206 and a user device 102. After presenting one or more interactive flow chart methods 110 associated with the one or more service problems, the method 400 may proceed to block 408.

At block 408, feedback from the user, based at least in part on the one or more presented interactive flow chart methods 110 may be received. For example, the user may provide feedbacks (e.g., one or more requests/commands) to the analytical module 212 via the one or more user devices 102 and/or the presentation module 206. The user may select (e.g., click on and/or scroll to) one or more method steps of the interactive flow chart method 110 based at least in part on the one or more service problems. The one or more user devices 102 may provide the user selected method steps of the interactive flow chart methods 110 to the analytical module 212 via the presentation module 206. After receiving feedback from the user based at least in part on the presented interactive flow chart methods 110, the method 400 may proceed to block 410.

At block 410, one or more subsequent method steps of the interactive flow chart methods 110 may be provided to the user. For example, the analytical module 212 may determine one or more subsequent method steps of the interactive flow chart methods 110 based at least in part on the feedback provided by the user. The analytical module 212 may provide the one or more subsequent method steps of the interactive flow chart methods 110 to the user via the presentation module 206 and/or the user devices 102. The user may continue to provide feedback to the analytical module 212 and/or the analytical module 212 may continue to provide one or more subsequent method steps of the interactive flow chart methods 110 to the user, until the end of the interactive flow chart method 110 and/or determination of one or more service problems. After providing one or more subsequent method steps of the interactive flow chart methods 110 to the user, the method 400 may proceed to block 412.

At block 412, diagnostic and/or analytical reports may be provided to the user. Upon the end of the one or more interactive flow chart methods 110 and/or the determination of the one or more service problems, the analytical module 212 may generate a report and/or a summary in order to provide diagnostic and/or analytical results to the user. The report and/or summary having diagnostic and/or analytical results may be printed and/or displayed to the user. For example, the analytical module 212 may display the report and/or the summary to the user via the presentation module 206 and/or the one or more user devices 102. Also, the analytical module 212 may provide the diagnostic and/or analytical report to the one or more user devices 102 via the presentation module 206 and the one or more user devices 102 may print the diagnostic report.

Figure 5:
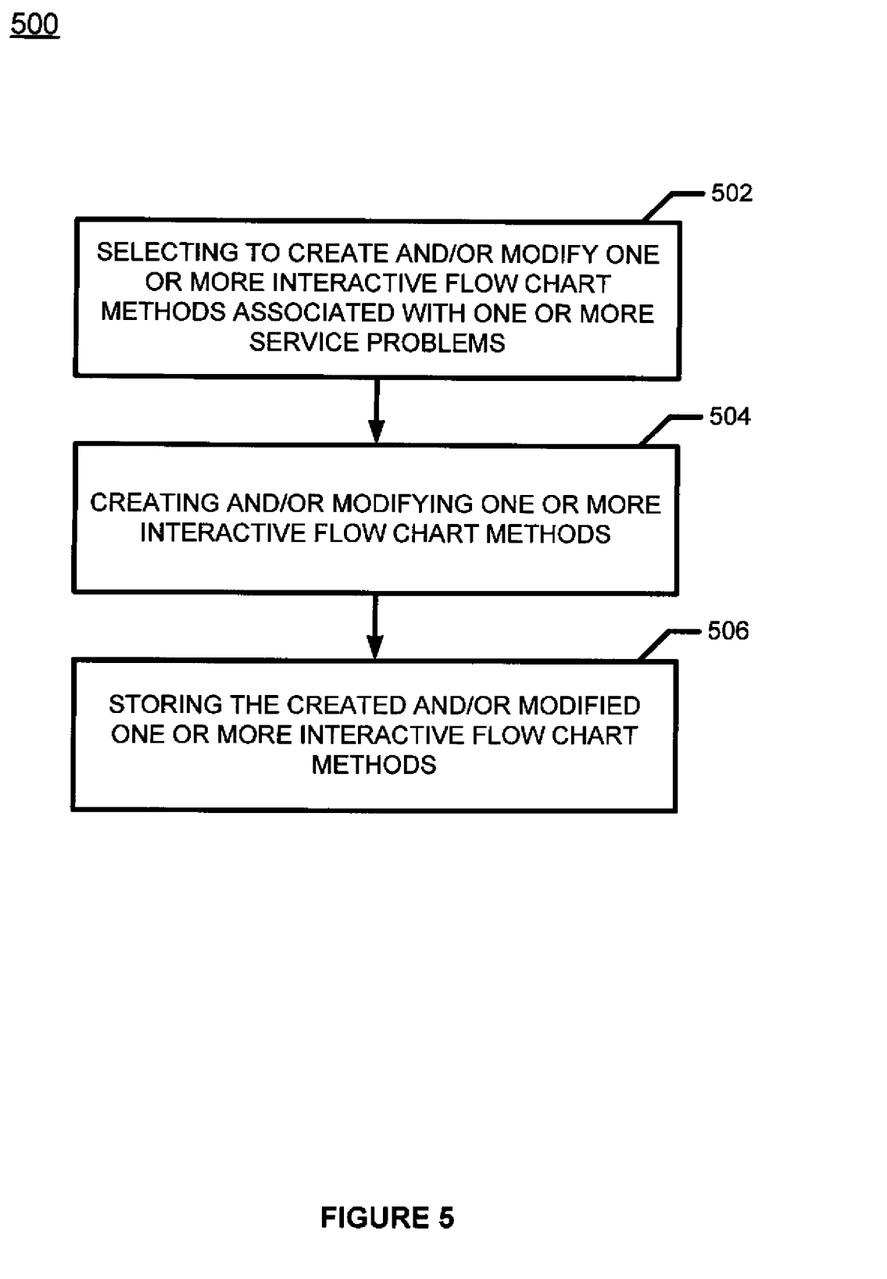
FIG. 5 illustrates a flow diagram of a method to create and/or modify interactive flow chart methods for diagnosing and/or analyzing one or more service problems in accordance with an exemplary embodiment.

FIG. 5 illustrates a system flow diagram to create and/or modify interactive flow chart methods for diagnosing and/or analyzing one or more service problems in accordance with an exemplary embodiment. The flow diagram 500 shown in FIG. 5 can be executed or otherwise performed by one or a combination of various systems. The flow diagram 500 described below may be carried out by system 100 shown in FIGS. 1 and 2 by way of example, and various elements of the system 100 are referenced in explaining the example flow diagram of FIG. 5. For example, one or more interactive flow chart methods 110 may allow one or more users to diagnose and/or analyze one or more service problems efficiently. Each block shown in FIG. 5 represents one or more processes, methods, or subroutines carried in the exemplary method 500. The method 500 may begin at block 502.

At block 502, a user may select to create and/or modify one or more interactive flow chart methods 110 in order to diagnose and/or analyze one or more service problems. For example, one or more service problems may arise and user may identify one or more interactive flow chart methods 110 in order to diagnose and/or analyze the one or more service problems. For example, the user may input one or more keywords into a diagnostic server 104 via one or more user devices 102 in order to search for one or more interactive flow chart methods 110. Analytical module 212 of the diagnostic server 104 may search a database 108 storing one or more interactive flow chart methods 110 based at least in part on the one or more keywords inputted by the user. The analytical module 212 may identify one or more interactive flow chart methods 110 based at least in part on the one or more keywords and present the one or more identified interactive flow chart methods 110 to the user via the presentation module 206 and/or the one or more user devices 102. Also, the user may identify one or more interactive flow chart methods 110 associated with the one or more service problems by searching an index and/or a table of interactive flow chart methods 110. In an exemplary embodiment, the analytical module 212 may arrange the one or more interactive flow chart methods 110 in the index and/or the table in an alphabetical order, a categorical order, a sequential order, most recently used order, and/or other orders. The user may search the index and/or the table of interactive flow chart methods 110 based at least in part on the one or more issues in order to identify one or more interactive flow chart methods 110 to diagnose and/or analyze the one or more service problems. After selecting to create and/or modify one or more interactive flow chart methods 110 associated with the one or more service problems, the method 500 may proceed to block 504.

At block 504, one or more interactive flow chart methods 110 may be created and/or modified. For example, one or more interactive flow chart methods 110 to diagnose and/or analyze the one or more service problems may not already be created. The user may select to create and/or modify one or more interactive flow chart method 110 based at least in part on one or more service problems. In an exemplary embodiment, in the event that one or more interactive flow chart methods 110 may not be created for one or more service problems, the user may create one or more new interactive flow chart methods 110 associated with the one or more service problems. The user may input one or more method steps into the analytical module 212 of the diagnostic server 104 in order to create one or more interactive flow chart methods 110 based at least in part on the one or more service problems. In another exemplary embodiment, the user may modify one or more existing interactive flow chart methods 110 based at least in part on one or more service problems. For example, the user may modify one or more method steps of the one or more interactive flow chart methods 110 based at least in part on the one or more service problems. After creating and/or modifying one or more interactive flow chart methods 110, the method 500 may proceed to block 506.

At block 506, one or more created and/or modified interactive flow chart methods 110 may be stored. For example, the analytical module 212 may store the one or more newly created and/or modified interactive flow chart methods 110 in a repository module 210 and/or the database 108.

In the preceding specification, various preferred embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

What is claimed:

1. A server system comprising:
a processor; and
a memory comprising computer-readable instructions which when executed by the processor cause the processor to perform the steps comprising:
receiving input, from a user, regarding one or more service problems;
acquiring one or more interactive flow chart methods in order to diagnose one or more service problems, wherein the interactive flow chart methods comprise one or more method steps;
presenting the one or more interactive flow chart methods to the user;
providing at least one of an index and a table of the one or more interactive flow chart methods from which the one or more interactive flow chart methods can be selected;
receiving a selection of one of the one or more interactive flow chart methods;
analyzing the selection to determine a first method step of the interactive flow chart method;
presenting the first method step to the user;
receiving one or more feedbacks from the user based at least in part on the first method step, the one or more feedbacks comprising at least one of: a request from the user or a command from the user;
determining a relationship between the first method step and a second method step of the interactive flow chart based on the one or more feedbacks comprising at least one of: a determined relationship and a modified relationship, wherein the modified relationship is modified from a determined relationship based at least on the command from the user;
upon determining the determined relationship, retrieving the second method step based at least in part on the one or more feedbacks;
upon determining the modified relationship, acquiring the second method step based at least in part on the one or more feedbacks; and
generating a diagnostic report of the one or more service problems based at least in part on the selection and the determination.

2. The system of claim 1, wherein acquiring the one or more interactive flow chart methods further comprises acquiring the one or more interactive flow chart methods from a local database or employing an acquire module for retrieving the one or more interactive flow chart methods from a remote database.

3. The system of claim 1, wherein acquiring the one or more interactive flow chart methods further comprises preprocessing the one or more interactive flow chart methods by at least one of filtering, formatting, segregating, and aggregating the one or more interactive flow chart methods.

4. The system of claim 1, further comprises configuring a repository module for managing the one or more interactive flow chart methods, wherein managing the one or more interactive flow chart methods comprises at least one of concurrent access, backup, archive, store, transfer, and discard the one or more interactive flow chart methods.

5. The system of claim 1, wherein analyzing the interactive flow chart method further comprises performing at least one of pattern matching analysis, time series analysis and forensic analysis of the interactive flow chart methods.

6. The system of claim 1, wherein analyzing the interactive flow chart method comprises modifying at least one of text of the one or more method steps of the interactive flow chart methods and an association of the one or more method steps of the interactive flow chart methods based at least in part on the one or more service problems.

7. The system of claim 1, wherein analyzing the interactive flow chart method comprises creating one or more new interactive flow chart methods based at least in part on the one or more service problems.

8. The system of claim 1, wherein receiving a selection of the one or more interactive flow chart methods comprises searching at least one of the index and the table of the one or more interactive flow chart methods based at least in part on the one or more service problems and based at least in part on an arrangement of the one or more interactive flow chart methods in an alphabetical order, a categorical order, a sequential order, and most recently used order.

9. The system of claim 1, wherein determining the determined relationship between the first method step and a second method step of the interactive flow chart interactively modifying the interactive flow chart method based at least in part on the command from the user.

10. The system of claim 1, wherein generating the diagnostic report comprising outputting the diagnostic report of the one or more service problems to one or more user devices, displaying the diagnostic report by the one or more user devices, and printing the report by the one or more user devices.

11. The system of claim 1, wherein determining the determined relationship between the first method step and a second method step of the interactive flow chart comprises interactively modifying a relationship between the one or more method steps of the interactive flow chart method based at least in part on the command from the user.

12. The system of claim 10, wherein the one or more user devices comprise a presentation module for providing the first method step of the interactive flow chart method and providing one or more determined subsequent method steps of the interactive flow chart method based at least in part on the one or more received feedbacks from the user.

13. The system of claim 10, wherein the one or more user devices comprise a presentation module for displaying a report that provides concerns, issues, and repairs associated with the one or more service problems diagnosed by the interactive flow chart method, wherein the one or more service problems include at least one of one or more Internet service problems, one or more television service problems, and one or more telephone service problems.

14. A server implemented method, comprising:
- receiving input, from a user, regarding one or more service problems;
- acquiring, via a server, one or more interactive flow chart methods in order to diagnose one or more service problems, wherein the interactive flow chart methods comprise one or more method steps;
- presenting the one or more interactive flow chart methods to the user;
- receiving a selection of one of the one or more interactive flow chart methods;
- analyzing, via the server, the selection to determine a first method step of the one or more interactive flow chart methods;
- presenting, via the server, the first method step to the user;
- providing, via the server, at least one of an index and a table of the one or more interactive flow chart methods from which the one or more interactive flow chart methods can be selected;
- receiving, via the server, one or more feedbacks from the user based at least in part on the first method step, comprising at least one of: a request from a user and a command from a user;
- determining, via the server, a relationship between the first method step and a second method step of the interactive flow chart based on the one or more feedbacks, comprising at least one of: a determined relationship and a modified relationship, wherein the modified relationship is modified from a determined relationship based on the command from the user;
- upon determining the determined relationship, retrieving, via the server, the second method step based at least in part on the one or more feedbacks;
- upon determining the modified relationship, acquiring from the user, via the server, the second method step based at least in part on the one or more feedbacks; and
- generating, via the server, a diagnostic report of the one or more service problems based at least in part on the selection and the determination.

15. The method of claim 14, further comprises modifying, via the server, at least one of text of the one or more method steps of the one or more interactive flow chart methods and an association of the one or more method steps of the one or more interactive flow chart methods based at least in part on the one or more service problems.

16. The method of claim 14, further comprises creating, via the server, one or more new interactive flow chart methods based at least in part on the one or more service problems.

17. The method of claim 14, wherein determining the determined relationship between the first method step and a second method step of the interactive flow chart comprises interactively modifying the interactive flow chart method based at least in part on the command from the user.

18. A non-transitory computer readable storage media comprising code to perform the acts of the method of claim 14.

* * * * *